United States Patent [19]

Lomet et al.

[11] Patent Number: 5,764,877
[45] Date of Patent: Jun. 9, 1998

[54] MEDIA RECOVERY WITH TIME-SPLIT B-TREES

[75] Inventors: David Lomet, Westford; Betty Salzberg, Newton, both of Mass.

[73] Assignee: Digital Equipment Corporation, Maynard, Mass.

[21] Appl. No.: 530,032

[22] Filed: Sep. 1, 1995

Related U.S. Application Data

[63] Continuation of Ser. No. 337,582, Nov. 9, 1994, abandoned, which is a continuation of Ser. No. 720,417, Jun. 25, 1991, abandoned.

[51] Int. Cl.$^6$ .............................. G06F 11/00; G06F 11/34
[52] U.S. Cl. .............................. 395/182.04; 395/182.13; 395/448; 395/600; 371/8.1
[58] Field of Search ................................ 395/180, 181, 395/182.04, 182.13, 182.14, 182.18, 600; 364/251.6, 252.4; 371/8.1

[56] References Cited

U.S. PATENT DOCUMENTS

| | | | |
|---|---|---|---|
| 4,611,272 | 9/1986 | Lomet | 364/200 |
| 4,814,971 | 3/1989 | Thatte | 371/12 |
| 4,878,167 | 10/1989 | Kapulka et al. | 364/200 |
| 4,945,474 | 7/1990 | Elliott et al. | 364/200 |
| 5,123,104 | 6/1992 | Levine et al. | 395/600 |
| 5,175,849 | 12/1992 | Schneider | 395/600 |
| 5,201,044 | 4/1993 | Frey, Jr. et al. | 395/575 |
| 5,204,958 | 4/1993 | Cheng et al. | 395/600 |
| 5,222,235 | 6/1993 | Hintz et al. | 395/600 |
| 5,280,612 | 1/1994 | Lorie et al. | 395/600 |
| 5,287,496 | 2/1994 | Chen et al. | 395/600 |

OTHER PUBLICATIONS

[MoLe] Mohan, C., and LEvind, F., ARIES/IM: An Efficient and High Concurrency Index Management Method Using Write-Ahead Logging, IBM Research Report RJ 6846, (Aug. 1989) IBM Almaden Research Center, San Jose, CA.

[Sagi] Sagiv, Y., Concurrent Operations on B* trees with over-taking, Journal of Computer and System Sciences, vol. 33, No. 2 (1986) pp. 275-296.

[Salz] Salzberg., B., Restructuring the Lehman-Yao tree, Northeastern University Technical Report TR BS-85-21 (1985), Boston, MA.

Yannis Manolopoulos Overlapping B+Tree for Temporal Data 1990, pp. 491-498.

VA-ON TAM 'Fast Recovery in Distributed Shared Virtual Memory Systems' 1990 pp. 38-45.

Lomet et al. 'A Robust Multi-Attribute Search Structure' 1989 pp. 296-304.

Sang Hyukson Distributed Checkpoint for Globally Consistent States of Databases 1989 pp. 1157-1167.

Le Gruenwald 'Reload in a Main Memory Database System:MARS'1990 pp. 174-176.

M. Samy Gamal-Elelin 'Local And Global Constraints In Database Integration' 1989 pp. 604-611.

[BASc] Bayer, R., Schkolnick, M., Concurrency of Operations on B-Trees, Acta Informatica, vol. 9 (1977) pp. 1-21.

(List continued on next page.)

*Primary Examiner*—Robert W. Beausoliel, Jr.
*Assistant Examiner*—Albert Décady
*Attorney, Agent, or Firm*—Joanne N. Pappas; Denis G. Maloney; Arthur W. Fisher

[57] ABSTRACT

Modern database systems provide media recovery by taking periodic backups and applying a transaction log to the backup to bring the data up-to-date. A multi-versioned database is one that retains and provides access to historical versions of data. The present invention shows how a history database, supported by the Time-Split B-tree, can be used to also provide the backup function of media recovery. Thus, the same versions used for database history are used for database backup. The cost of taking a backup is comparable to the cost of a good differential backup method, whereby only changed data is backed up. The media recovery cost, especially when the media failure is only partial, e.g., a single disk page, will frequently be lower.

10 Claims, 2 Drawing Sheets

OTHER PUBLICATIONS

[EGLT] Eswaren, K., Gray, J., Lorie R. and Traiger, I., The Notions of Consistency and Predicate Locks in a Database System. Communications of ACM vol. 19, No. 11 (Nov. 1976) pp. 624–633.

[LeYa] Lehman, P., Yao, S.B., Efficient Locking for Concurrent Operations on B–Trees. ACM Trans on Database Systems, vol. 6, No. 4 (Dec. 1981) pp. 650–670.

[Lom1] Lomet, D.B. Process structuring, synchronization, and recovery using atomic actions. Proc. ACM Conf. on Language Design for Reliable Software, SIGPLAN Notices 12, 3 (Mar. 1977) pp. 128–137.

[Lom2] Lomet, D.B. Subsystems of Processes with Deadlock Avoidance. IEEE Trans. on Software Engineering, vol. SE–6, No. 3 (May 1980) pp. 297–304.

[Lom3] Lomet, D.B. Recovery for Shared Disk Systems Using Multiple Redo Logs. Digital Equipment Corp. Technical Report CRL90/4 (Oct. 1990) Cambridge Research Lab, Cambridge, MA.

[LoSa1] Lomet, D., Salzberg, B., Access Methods for Multiversion Data, Proc. ACM SIGMOD Conf. 1989, Portland, OR, pp. 315–324.

[LoSa2] Lomet, D., Salzberg, B., The hB–Tree: a Multiattribute Indexing Method with Good Guarantee Performance [to appear in] ACM Trans on Database Systems, vol. 15, No. 4 (Dec. 1990).

[MHLPS] ARIES: A Transaction Recovery Method Supporting Fine–Granularity Locking and Parial Rollbacks Using Write–Ahead Logging. IBM Research Report RJ 6649, (Jan. 1989) IBM Almaden Research Center, San Jose, CA.

[ShGo] Shasha, D., Goodman, N. Concurrent Search Structure Algorithms, ACM Trans. on Database Systems, vol. 13, No. 1 (Mar. 1988) pp. 53–90.

FIG.1
PRIOR ART

SUCCESSIVE CHANGES IN A TIME-SPLIT B-TREE INDEX NODE
SHOWING THE KEY RANGES AND THE TIME RANGES REFERENCED.
AT THE END, A KEYSPACE SPLIT IS MADE.

ADD 110 SUE AND DO A KEY SPLIT:

NOW ADD 60 RON AND 90 JOAN AND DO A TIME SPLIT.

NOW ADD 80 MARY AND 70 BILL AND DO A KEY SPLIT.

NOW DO A KEYSPACE INDEX SPLIT (DUPLICATE
NEEDED TO LOCATE PETE).

FIG. 2

MEDIA RECOVERY WITH TIME-SPLIT B-TREES

This application is a continuation of application Ser. No. 08/337,582, filed Nov. 9, 1994 now abandoned, which is a continuation of application Ser. No. 07/720,417, filed Jun. 25, 1991, now abandoned.

FIELD OF THE INVENTION

The present invention relates generally to media recovery in database systems, and more particularly to the use of a multi-versioned database, supported by the Time-Split B-tree, to provide the backup function of media recovery.
Background of the Invention Modern database systems guard against media failure by taking periodic backups and applying a transaction log to the backup to bring the data up-to-date. The backup reflects a previous version of the database, and the transaction log contains records of any changes made to the database since the last backup. Media failure recovery is essentially redo recovery in which actions on the log that might not be reflected in an available stable version of data are applied to that version to bring it up-to-date. The log is scanned, starting at some safe point where it is known that all actions logged before the safe point are in the available version. It is important that the redo safe point for media recovery be controllable by the backup process. This requires that all updates logged prior to a proposed new safe point be stably recorded by the backup process. By updating the backup version with the changes recorded in the transaction log, the database system recreates the database as it existed just prior to the media failure.

Some database systems retain and provide access to historical versions of data. These are known as multi-versioned databases. In Lomet, D. and Salzberg, B., *Access Methods for Multiversion Data*, Proc. ACM SIGMOD Conference, Portland, Oreg. (June 1989) pp. 315-324, and Lomet, D. and Salzberg, B., *The Performance of a Multi-version Access Method*, Proc. ACM SIGMOD Conference, Atlantic City, N.J. (June 1990) pp. 354-363, a multi-versioned database called the time-split B-tree ("TSB-tree") is described. The TSB-tree is a partitioned temporal database accessible by a common index. The database has two components: a history database and a current database. The history database contains the same kind of information found in a backup, information that describes a previous state of the database. If the history database also serves as the backup, the history nodes of the TSB-tree will serve the dual purposes of a database back-up and a history database. Such a scheme truncates the log used in media recovery and reduces media recovery costs while maintaining the benefits of a working history database.

Current media recovery methods are not applicable to TSB structures, insofar as using a partial backup technique that would provide any relative efficiency in terms of memory space and time. There is, therefore, a need for a method of media recovery which is less costly in terms of memory space and time.

OBJECT AND SUMMARY OF INVENTION

It is the general object of the present invention to provide media recovery for a database system using the history nodes of the TSB-tree not only for a history database but also for a database backup. When using a TSB-tree for backups, (potentially non-full) nodes may also be time-split to assure that the required versions of data are in history nodes of the tree. When backup begins, the current database is traversed and any nodes updated since the last backup are time-split. This will force the necessary versions of data to the history database. When backup processing is complete, there is provided a new safe point on the transaction log from which to start redo media recovery.

It is another object of the present invention to make a backup via the use of TSB-tree have the efficiency of conventional techniques. Thus, for the backup process, additional objects are such that:

1. No changes are made to the current data nodes of the TSB-tree.
2. The only log records describe the updating of the index required to make the backup usable as a history database. Versions of data are not logged.
3. TSB-tree index growth is minimized by exploiting the redundancy inherent in the backup process to purge unneeded index terms from the index nodes.
4. Concurrency is enhanced, minimizing the impact of backup on normal database activity, by using short term locks (called latches).
5. The writes of the backup copies and the writing of the log records describing the index changes are batched, permitting efficient sequential I/Os.
6. All index terms for one index node are posted before proceeding to the next index node. This clustering of index updates reduces the I/O cost of performing them.
7. Recovery from system crashes is almost entirely conventional. Should backup be in progress when the system crashes, a small amount of additional work is needed to permit backup to resume.

In a preferred embodiment, the present invention provides a method of media recovery for use in a database system, in which the following steps are performed: performing two-dimensional search structure at least partly defined by nodes and key and time dimensions, such that certain media in the database system is located by traversing the nodes using respective ones of the key and time dimensions, the nodes including history nodes which are regularly backed-up and including current nodes and index nodes; determining that a predetermined period of time has passed; in response to the predetermined period of time passing, time-splitting into current nodes and history nodes, and backing-up, certain nodes having data that has changed during the predetermined period of time plus the index nodes that are associated with said certain nodes; and using the backed-up history nodes to recover from an undesired and abnormal system interruption.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DESCRIPTION OF THE PREFERRED EMBODIMENT

I. Introduction

An important aspect, and a part, of the present invention concerns a media recovery technique which is less costly in terms of the amount of data that is required for backing-up to provide an accurate recovery. The following sections discuss each aspect of the present invention. In Section II, the TSB-tree is reviewed. The update process for records in a TSB-tree is described in section III. Included here are the steps that must be taken in order to prepare for backup. Section IV shows how to modify TSB-tree node splitting to accommodate backup. Section V describes the details of the backup-induced splitting, showing the particular steps and their order. Section VI describes the overall backup process, and how it is possible to optimize the node splitting costs because backup is a "batch" operation. Section VII outlines media recovery, i.e., how one can find the backup copies of nodes and how the log is applied. At the end, there is a brief discussion of the results of the present invention and their range of applicability.

II. The TSB-Tree

The TSB-tree is a two dimensional search structure that provides access to both key space and the time dimension. Each node of the TSB-tree describes a rectangle in time-key space. This space is searched to find appropriate records, and it is partitioned to adjust to changing numbers of entries. The TSB-tree search algorithm and its split algorithms for index and data nodes, as originally presented in Lomet, D. and Salzberg, B., Access methods for a multiversion access method, *Proc. ACM SIGMOD Converence*, Portland, Oreg., (June 1989), pp. 315–324, are described below. Using the TSB-tree for backup changes these algorithms. These are described in subsequent sections.

The TSB-tree index entries are triples consisting of time, key, and pointer to lower-level tree node. Time and key respectively indicate the low time value and the low key value for the rectangular region of time-key space covered by the associated lower-level node. A search for a record with a given key valid during a given time proceeds as follows:

One begins at the root of the tree. All index entries with times later than the search time are ignored. Within a node, look for the largest key smaller than or equal to the search key. Find the most recent entry with that key (among the non-ignored entries with time not later than the search time). Follow the associated address pointer. Repeat this algorithm at each level of the tree until a leaf is reached. At the leaf, look for an exact match on key when doing a point search. For a range search, look for the smallest key larger than or equal to the search key, now playing the role of lower bound on the key range.

Figure 1:
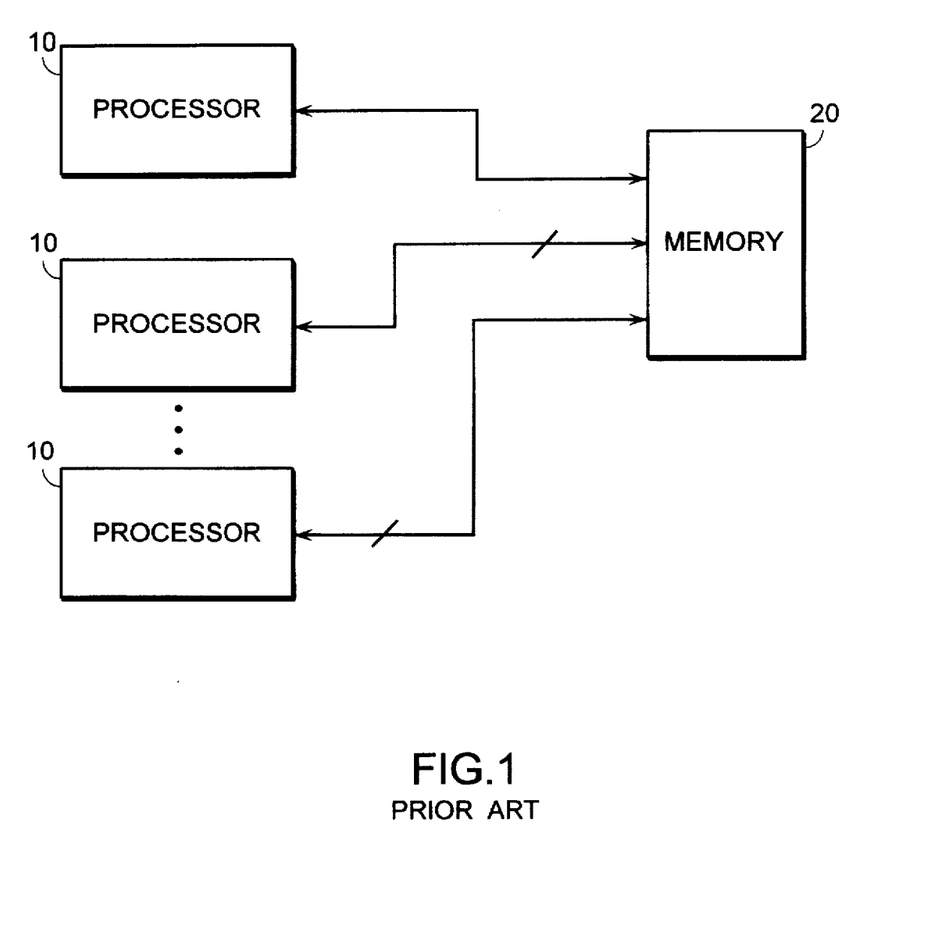
FIG. 1 is a diagram of a conventional processor arrangement typifying an application for the present invention.
Figure 2:
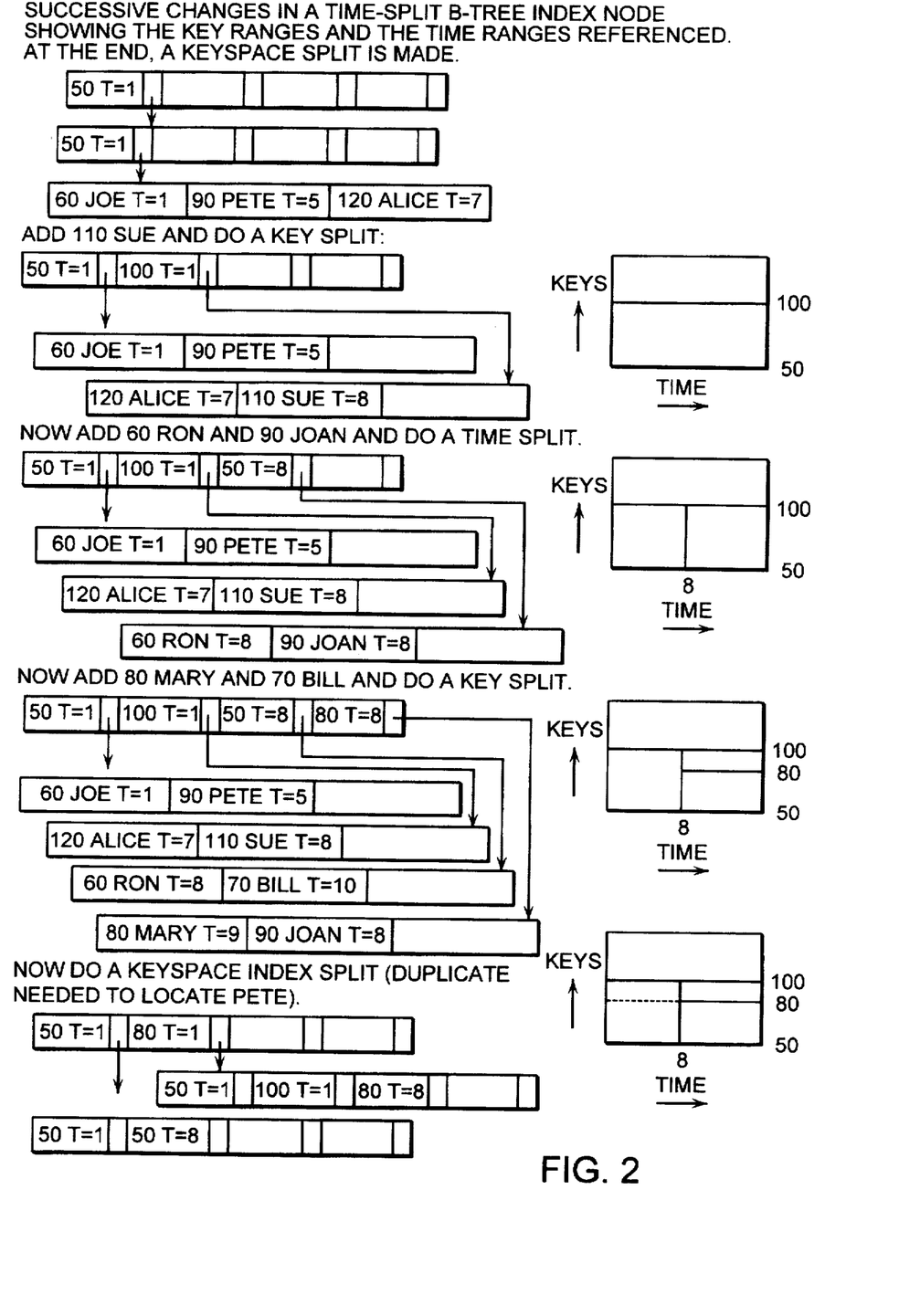
FIG. 2 is a diagram exemplifying successive changes in a conventional TSB tree.

A node of the TSB-tree can be split by time or by key. Deciding whether to split by time, or by key, or by both time and key, impacts the characteristics of the resulting TSB-tree. The implications of splitting policy are explored in depth in [Lomet, D. and Salzberg, B., *The performance of a multiversion access method*, *Proc., ACM SIGMOD Conference*, Atlantic City, N.J., (June 1990) pp. 354–363]. The publication describes only the mechanics of the splitting process. All nodes split using these processes will be well formed trees. Their storage utilization, redundancy and search performance will typically depend on split policy. A sequence of splits is illustrated in FIG. 2, which is FIG. 7 from [Lomet, D. and Salzberg, B., Access methods for a multiversion access method, *Proc. ACM SIGMOD Converence*, Portland, Oreg, (June 1989), pp. 315–324].

If a node is split by time T, all entries with time less than T go in the history node. All entries with time greater than or equal to T go in the current node. For each key (of a record in a data node or an entry in an index node), the entry with the largest time smaller than or equal to T must be in the current node. Thus, records which are valid both before and after T have copies in both nodes. For index nodes, entries referring to lower level nodes whose regions span T are copied to both the history index node and the current index node.

Any time after the begin time for a data node can be used for a data node time split. For an index node time split, the split time cannot be later than the begin time for any current child node. Thus, history index nodes do not refer to current nodes. Hence, index entries are posted to only one node. History nodes, which do not split, may have several parents. Current nodes have only one parent.

If a data node is split by key, the split is exactly the same as in a B-tree. All the records with key greater than or equal to the split value go in the new node and the records with key value less than the split value remain in the old node.

Key splitting for index nodes is a little different since the elements referred to by the index entries are rectangles in time-key space. Data records correspond to a line segment (one key value) in the time-key space. To split an index node, a key value from one of the index entries is chosen as the split value. References to lower level nodes whose key range upper bound is less than or equal to the split value stay in the old node. Those whose lower bounds are greater than or equal to the split value go in the new node (higher keys). Any lower level node whose key range strictly contains the split value is copied to both nodes (see FIG. 2). Note that because the key space is refined over time, any entry which is copied to both the new and the old node is a reference to a history node.

Mutual exclusion is assured while splitting is being done in volatile memory. Latches are used for this, which are short term and usually cheap, e.g., semaphores. Setting a latch does not normally require a database lock. Hence, the lock manager is not normally invoked.

When we split a node, the node is latched. For very high concurrency, this latch is released before the index entry is posted. Then the index node is latched, updated and unlatched.

Concurrent B-tree update poses a problem. That is, how is the TSB-tree kept consistent when there are concurrent tree modifications (node splits) such that the index term for a node may need to be in another index node by the time that the node split is complete. This can be accomplished with the B-link-tree technique of [Lehman, P. and Yao, S. B. Efficient locking for concurrent operations on B-trees, *ACM Trans. on Database Systs.*, 6,4, (December 1981), pp. 650–670, Sagiv, Y., Concurrent operations on B*trees with overtaking, *Proc. ACM SIGACT-SIGMOD PODS Conference*, Portland, Oreg, (June 1985), pp. 28–37, and Salzberg, B., Restructuring the Lehman-Yao tree, *Northeastern U. Technical Report*, pp. 85–21, (1985)]. This technique leaves a forwarding address for the new, split-generated, node in the original node. A concurrent node splitting method, which copes with system failures as well, for very general index tree structures is described in [Lomet, D. and Salzberg, B., Concurrency and recovery for index trees, (In preparation)]. TSB-trees are among the structures handled.

There is one complication when using B-links with the TSB-tree. If there is a key split of an index node before an index entry for a child node can be posted, there is no problem. The forwarding address is used if necessary. If there is a time split, the "new" split-generated node is a history node. If a time split of the parent node occurs between the time a child node is split and its index term is posted, it is possible, but very rare, that the index term belongs in the new history index node. If so, since we follow the rule that history nodes are not updated, we do not post the index term. This requires that a forwarding address be used permanently to access the node.

III. The Updating Process

This section describes the elements of the updating of data in a TSB-tree that are particularly relevant to the backup of a database. It is during updates to the database when preparation for database backup begins.

Timestamps distinguish the versions of data and enable the TSB-tree to readily support AS-OF queries. A brief description of how data is timestamped follows.

Choosing a time for a transaction at its start has the advantage that it can be easily propagated to all transaction cohorts and is available at the time the updates to the database are being made. Nonetheless, early choice of time excessively constrains serialization order, leading to more transaction aborts than is desirable.

The choice of time is delayed until a transaction is committing. Choosing the time then permits it to reflect the serialization order actually experienced by the transaction. However, changed data must be visited twice. On first visit, the data changed by a transaction is stamped with the transaction's identifier (TID). After commit, the TID is replaced with the time chosen for the transaction in a second visit.

With distributed systems, cohorts of a distributed transaction negotiate the transaction time and this time must be distributed to cohorts so that they can stamp their changed data. Two phase commit (2PC), or some variant, is executed to guarantee atomicity of distributed transactions. The 2PC protocol messages can be augmented so that cohorts can agree not only on whether to commit a transaction, but also on transaction time [Lomet, D. Consistent timestamping for transactions in distributed systems, *Digital Equipment Corp.-Technical Report CRL90/3*, Cambridge Research Laboratory, Cambridge, Mass. (September 1990)]. In this augmented protocol, the transaction coordinator chooses the transaction time based on the times voted by cohorts and distributes this chosen time along with the commit message.

Two-phase commit has an "in-doubt" phase, where a participant in a transaction has declared itself ready to commit, but has not received the commit message from the coordinator. Therefore, there may be records in TSB-tree nodes whose transaction time is earlier than the current time, i.e., the time has already been chosen, but the information has not been received by the cohort. This impacts the time-splitting of nodes. The present invention will exploit the fact that the time chosen by the coordinator will never be earlier than any of the times voted by cohorts.

Once a transaction has committed, its TID will be overwritten by its transaction time in updated data. Thus, a TID-TIME translation table that associates TID with transaction time is needed. (In [Stonebraker, M., The design of the Postgres storage system, *Proc. 13th VLDB Conf.*, Brighton, UK, (September 1987), pp. 289-300], this table was called the TIME relation.) Since timestamping goes on AFTER a transaction has committed, the association between a transaction and its time is stably stored. This permits timestamping to be completed across system crashes. Storing the transaction time in the commit record for the transaction on the recovery log is one effective way of accomplishing this. Additional mechanism might be needed or useful in order to speed the recovery process or to facilitate log management.

All versions in a history node that can be encountered via TSB-tree search are stamped with their transaction time, not their TID. If the timestamping has not been completed for versions in the current node when the node is being split, the transaction time in the TID-TIME table is accessed so as to complete the timestamping. This is important for two reasons:

1. Choosing an appropriate split time requires this knowledge.
2. History nodes are not updated (they may be on WORM devices) so this is our last chance to timestamp the history data.

To facilitate dealing with prepared transactions whose commit time is not known, it is useful to also include, in the TID-TIME table, prepared transactions and their time of prepare. Thus, this table contains the attributes (i) TID, (ii) TIME: either transaction time or time voted during prepare, and (iii) STATUS: either committed or prepared.

It is not necessary to copy all current nodes to history nodes. Only the nodes that have changed since the last backup, plus the index nodes need be backed up and split. Copies of the other nodes are already in the history database via a previous backup.

It is possible to store appropriate information in each node as to whether its backup is required. But, relying on this implies the need to read all TSB-tree current data nodes in order to perform a backup, even though only some are in need of backup. The present invention avoids this read-all sweep by separately recording which nodes need to be split outside of the nodes themselves.

The Node Change Vector or NCV is a bit vector with one bit for each node in the TSB-tree. When a data node is changed, its need for backup is indicated by setting its designated bit to one. This bit is reset to zero after a node is split for backup.

When a backup occurs, all data nodes whose bits are one are read and backed up. Other data nodes are not accessed. Instead of a real-all sweep of the TSB-tree, we consult the NCV to determine which nodes need backup. Conceptually, all updates before a node is visited during backup are before the backup and go in the "old" NCV. Nodes updated after the visit are after the backup and go in the "new" NCV that determines what is backed up during the next cycle.

IV. Elements of Backup-Induced Splitting

New considerations govern the details of node splitting for backup. These considerations, involving all aspects of the time-splitting process, are discussed below.

Previously [Lomet, D. and Salzberg, B., Access methods for a multiversion access method, *Proc. ACM SIGMOD Converence*, Portland, Oreg. (June 1989), pp. 315-324 and Lomet, D. and Salzberg, B., The performance of a multiversion access method, *Proc., ACM SIGMOD Conference*, Atlantic City, N.J., (June 1990) pp. 354-363], redundancy in the history database was either minimized, or led to reduced overall storage costs. For backup, the present invention exploits redundancy. Backup requires that versions of data that are only in the current database be redundantly stored in the history database.

Thus, the entire current node is written to the history database. This ensures that all updates logged prior to the backup safe point in the log will be present in the backup copy of the database represented by the history nodes. This may involve writing uncommitted data and unstamped (indoubt) data to history nodes. It does not cause a problem because the split times chosen for the index terms point to the current node when this data is desired. Such data in history nodes is harmless with respect to searches and useful with respect to backup and recovery.

If there are records in the current node which have TIDs of committed transactions (are not timestamped), the TIDs are replaced with their transaction times. (The copy of the record in the current database still needs to be stamped as the current database is not written during the backup process, as described in the next subsection.)

Backup-induced time-splits do not remove data from current data nodes. Hence, current data nodes do not require re-writing. Backup makes no changes to the current database except for the posting of appropriate index terms that link to the new history nodes.

Like a history node, a current node can contain versions of data that are inappropriate for the time slice of the database for which it is responsible. We refer to this data as useless data. Useless data is harmless in that it will never be found in a search of the TSB-tree. Useless versions are those that are too old, i.e. they ceased to be current at a time prior to the start time indicated by the index term for this current node.

When normally inserting new versions of data into a current node, the useless versions left by backup-induced time-splitting can be removed if their space is needed. However, it is desirable to NOT remove useless versions UNLESS their space is needed. The presence of useless versions means that a current node continues to include all versions that were in its last backup history node. Once useless versions are removed, this "covering" ceases. This redundancy will reduce the number of index terms. See section IV.

To detect useless versions, a START time is kept in each current node. START is the earliest time covered by data in the node. The current node includes all data versions in its key interval from START until the current time. START indicates the last time used in removing versions from the node. When this time is earlier than the start time in the index term for the node, unless version may be present.

The start time posted with an index term resulting from a backup induced time-split will not match START in the node since the current node is not written during backup. This indicates that some cleanup is possible in which the too-old entries can be eliminated to make room for new versions.

In backup-induced splitting, the choice of split time does not alter the contents of the current node or the contents of the backup copy of the current node. What is affected by the choice of split time is the start time that is posted with the index term that describes the split. Index nodes and data nodes choose their split times very differently. These are discussed separately below.

In the absence of records of prepared (in-doubt) transactions, whose commit status and transaction time are unknown, current time can serve as the split time. This is the choice made for the WOB-tree [Easton, M. Key-sequence data sets on indelible storage, IBM J. of R. D. 30,3, (May 1986) pp. 230-241], and which are referred to as the WOB-policy [Lomet, D. and Salzberg, B., Access methods for a multiversion access method, Proc. ACM SIGMOD Converence, Portland, Oreg. (June 1989), pp. 315-324 and Lomet, D. and Salzberg, B., The performance of a multi-version access method, Proc., ACM SIGMOD Conference, Atlantic City, N.J., (June 1990) pp. 354-363]. It is the ideal choice as it maximizes the number of useless versions in the current node. This choice is possible even when there are versions from uncommitted transactions in the node. These transactions will commit (if they commit) after the current time, and hence their versions are not encountered in a search.

When there is a record in the node from an in-doubt transaction, it is unknown whether its transaction time is before or after the current time. It is known, however, at what time the transaction was prepared locally, and what the local cohort voted as an earliest acceptable time. This voted time is found in the TID-TIME table. The earliest prepare time of any such record is chosen as its split time. This choice ensures that all searches for unstamped versions go to the current node, where they will eventually be stamped with their transaction time. The copies of these versions in the history database will be uncommitted as of the split time. Hence, in the history database, they look just like uncommitted versions.

Current time is not used when splitting index nodes. Index terms in history index nodes that are part of any search should not reference current nodes. Current data can move as a result of key splitting. Thus, the index term for current data may need to be updated. History nodes are not updated. These nodes may, for example, be stored on a WORM disk.

The split time chosen is later than the time of the oldest current index entry. This time reflects the oldest (earliest) split time for any current descendent node. Such a split time enforces the above constraint. The way in which backup produces history nodes for the entire TSB-tree permits the split time for index nodes to be after (or at) the time at which the backup started (see section V).

Index terms for the backup-induced new history nodes are posted to the correct index node. The posting of these terms is done in the same basic way that index terms are usually posted to B-tree type indexes and in the same way as in TSB-trees. However, there are unique considerations discussed below.

In any tree index, a node $N_2$ covers another node $N_1$ if all versions of data that are in $N_1$ are also in $N_2$. Thus, the index term for the covering node can replace the index term for the node that it covers. The covered node becomes inaccessible, but, since all versions of data in the covered node are in the covering node, no information is lost in the process.

In a TSB-tree, a node covers another if it is responsible for more of the multi-dimensional time:key space than the other. Each TSB-tree index node contains a sufficient information so that the key and time boundaries of each references node can be determined. START and END times and LOWKEY and HIGHKEY for each must be available (or derivable). Hence, the present invention can detect when nodes for a newly posted split cover nodes referenced via index terms in an index node. Index terms for covered nodes can be eliminated.

Frequently, with backup-induced splits, a new history node covers a previous history node. A new history node $H_2$, produced during backup, covers an existing history node $H_1$, if it is responsible for the same key space region as $H_1$ and $START_2 = START_1 \& END_2 \geq END_1$. (Other covering conditions are not normally possible.) Since these covered nodes are history nodes, they will never be subject to updates. Users do not care whether they read data from the covered node or from the covering node.

The node covering optimization is important for both data and index nodes because of the frequency of one node covering another as a result of backups. There are five cases that arise during backup for nodes referenced from an index node.

1. No change to referenced node: The node "covers" itself; The present invention advances the time demarcating the most recent history node and the current node to the current time without writing a new history node.

2. Only added versions to the referenced node: The node was changed between updates, but did not split. Nor were "useless versions" removed. The new backup-induced history node covers the prior history node generated at the last backup.
3. Versions removed: The current node has had versions removed as a result of a split (time or key) or because useless versions were removed. The history node generated during backup will not cover a previous history node. Hence, its index posting results in an additional index term.
4. New node: The node is a result of a key split, and does not have a prior history node. Its new history node does not cover any previous history node. Hence, its index posting will result in additional index terms.
5. Covering normal node: A "normal" time split has occurred after the backup node is written, but before its index entry is posted. If this "normal" history node covers the backup node, the backup index entry will not be posted. The "normal" history node covers this period of history, instead. (This case is rare.)

The reduction in number of index terms, brought about by exploiting node covering, greatly reduces the frequency with which index nodes split. Because only splits remove index terms referencing history nodes, the backup of index nodes should frequently result in a history index node that covers the prior history index node. That is, index nodes can frequently be instances of case 2 above. Useless versions of index terms should not be removed from the current index node during a backup so as to enhance the frequency with which the next backup-induced history index node covers this one. However, useless versions can be removed should the space be needed.

Whether or not the history node for an index node covers the prior history node for the index, it is always possible to advance the start time associated with a current index node. The backup process guarantees that all index terms for current nodes have START times that are advanced by the backup process. Even when no backup of a node is required (case 1 above), the START time for the index term for the current node is advanced. START time is not older than the oldest prepared transaction in the data node at the time that it is backed up. Hence, a current index node can be time-split, generating its new backup history node, using the time of the oldest prepared transaction whose versions are in the subtree spanned by the index node.

V. The Splitting Process

In order to make our backup process as efficient as conventional backup, the present invention exercises care to minimize data contention and the amount of data placed on the system recovery logs. Also, backup needs to work correctly, leaving a well structured TSB-tree, should a failure occur at any arbitrary time during the execution of the backup process.

Essentially, a backup-induced time-split requires that three steps be accomplished. As usual for the permanence of an activity, the activity needs to be logged stably. In a preferred embodiment of the present invention, the following three steps are required to be made stable in the order given below. The subsequent subsections explain how these steps are accomplished and why the ordering is important.

1. Writing the History Node. The current node is copied to form the history node, which is force written to the stable history database. Should the history database be on a WORM device, the space used is permanently consumed. A flag identifies the history node as a backup node.

2. Logging the Split. That a backup-induced time-split is done for a node is logged so that the split is durable. This log record describes the update to the parent index node.

3. Writing of the Index Node. The parent index node of the split node is updated to make the new history node accessible.

Recovery for nodes of the history database is handled differently from recovery for nodes of the current database. This is true for both media failure recovery and crash recovery.

Media failure: History node media failure is not discussed at all. The method described here does not support such recovery, though enough information may persist to recover from some failures.

System crash: The initial contents of history nodes, which are derived from the contents of current nodes, are not logged. Thus, a history node cannot be regenerated from the contents of the log.

To assure crash recovery for history node creation, the history node is force written to the stable history database prior to recording stably any other information about the time-split that generated it. This differs from current nodes, whose write to stable storage can be extensively delayed. The early forced write of the history node means that creation of the history node will not need redoing when log records documenting the time-split are encountered during redo recovery.

Once history nodes are created, they undergo no further changes and hence, they need no further crash recovery support. The redo recovery process need not be aware of history nodes. Redo is applied solely to the nodes of the current database.

In a preferred embodiment of the present invention, independent redo recovery is provided [Lomet, D. Consistent timestamping for transactions in distributed systems, *Digital Equipment Corp.-Technical Report CRL90/3*, Cambridge Research Laboratory, Cambridge, Mass. (September 1990) and Mohan, C., Haderle, D., Lindsay, B., Pirahesh, H. and Schwarz, P., ARIES: a transaction recovery method supporting fine-granularity locking and partial rollbacks using write-ahead logging, *Research Report RJ6649*, (January 1989), *IBM Almaden Research Center*, San Jose, Calif. and *ACM Trans. on Database Systs.* (to appear)] for current data nodes. Independent recovery permits each node's recovery to be done by applying its log records to its previous states, independent of the log records and states of any other nodes. Hence, the present invention uses separate log records for each current node changed by a split.

Three log records are needed for a key split. One lists the records that are placed in the newly created node. The second describes the removal of records from the original node. The third describes the update to the parent index node. All changes to the structure of the index tree must leave the tree well-formed, even in the presence of system crashes. Ensuring this requires enforcing an appropriate unit of atomicity, which can be non-trivial. (In [Lomet, D. and Salzberg, B., Concurrency and recovery for index trees, (In preparation)], describing how this can be done efficiently and with high concurrency.)

For a backup-induced time split, much less needs to be logged. First, the current (original) node is unchanged. Second, by force writing the history node first, its creation never needs redoing. Neither of these nodes needs a log record. Hence, a backup split needs only a single log record describing the posting of the index term for the split. Hence, backup-induced time-splits are trivially atomic. If the log record is not present, the split has not been done. If the log record is present, the split has been done and is durable. The log never contains a partial backup-induced time-split which might have required undo recovery. This simplifies crash recovery.

Care needs to be exercised during the resumption of a backup after a crash to avoid losing the space used by history nodes written for time-splits that were not logged. This is described in section VI.

The log information describing the posting of the index term for a backup-induced time-split includes the following:

NODE: index node being updated;
OPERATION: the fact that this is the posting of index terms for a backup-induced time-split;
LOWKEY: the low key for the range of keys in the split nodes;
HIGHKEY: the high key for the range of keys in the split nodes;
HSTART: start time for versions in the history node;
CSTART: start time for versions in the current node. This is the end time for the history node. (The current node contains useless versions between HSTART and CSTART.)
CURRENT: location of the current node being split;
HISTORY: location of the history node. The history node is either a preexisting node (case 1 of 4.4.2) or a new node (case 2).

Backup of a changed current data node can be done atomically. The node is share-latched by the buffer manager to assure read consistency while it is copied to the history database buffer to become the history node. This latch can be dropped as soon as the copy is complete, making for minimum interference with ongoing transactions. The necessary timestamping for the history node can be done after the copy.

Once the history node is stably written, the parent index node is updated. This requires an exclusive latch on the index node. The split is durable when the log record is stable. The write-ahead log protocol is observed to ensure that the log record describing the updated index node is stable by the time the index node itself is stable. Index node updating during backup may require that the index node be split. This complication is dealt with in the next subsection.

Index node backup is more complex than data node backup because backup itself updates index nodes. It is essential to capture these updates in the backup induced history node so that this node will correctly reference all backup nodes for its descendents. Thus, an index node is backed up only after the completion of backup for all its descendents, the writing of the history nodes, the posting of the index terms, and the logging of each split. After this, the ordering steps described in section V, work correctly for the backup of index nodes.

An index node is updated by the backup of its descendents over a relatively extended period of time. Each update is only protected by a short-term exclusive latch on the node so that ongoing transactions can make updates to an index node interleaved with the updates caused by the backup process. Index node backup needs to deal with both forms of update. It is the posting of index terms for backup history nodes that makes these nodes available as history nodes in the multi-versioned database. Posting the index terms to a current index node, instead of to a separate copy of it, is the only expense of having backup nodes serve in the multiversioned database as well.

Prior to backing up an index node, the present invention backsup the subtree of which it is a root. Backup sweeps through an index node, backing up descendent nodes. For higher level index nodes, whose descendents are themselves index nodes, all descendents require new history nodes to be created. For the lowest level index node, only the data nodes indicated in the NCV as having changed result in new history nodes. The descendent node backup is complete when the parent index node is updated to reflect its backup A backup sweep cursor is a key oriented structure, which is described fully in section VI, that indicates that last descendent node that was backed up. This sweep cursor remains valid across index updates, both backup induced and from ongoing transactions.

All changes to the index node prior to the creation of its backup-induced history node are captured by the backup. All of these changes remain available in the truncated log that will be scanned for media recovery. This redundancy is harmless because of the idempotency of redo recovery.

Should an index node time-split during its backup, no special measures are required. Time splitting does not remove current versions. Hence, current index terms needed for the backup of the index node continue to be covered in the changed index node. History version removal does result in the backup-induced index history node NOT covering a prior history node. This is dealt with when the parent node is updated to reflect the backup-induced split.

The biggest complication involves the key splitting of an index node during its backup. There are two cases:

1. The backup sweep of the present invention has already finished with the index terms in one of the nodes resulting from the split. In this case, immediately perform backup on this completed node, and continue the sweep of the incompletely processed node.
2. A sweep of either of the resulting nodes is incomplete. Proceed as if the split hadn't occurred, and backup the index node that is being currently worked in (after the split) when the sweep is complete.

Backing up the root of a TSB-tree needs to be handled somewhat differently than the backup of an ordinary index node. There is no index node above the root into which to store the index terms describing the backup-induced time-split of the root. Normal B-tree splits of a root cause the creation of a new root, but this new root, of necessity, is in the current database, hence requiring backup itself. This recursion requires breaking.

Instead of splitting the root when it is time-split during backup, the present invention places a reference to the history root into a highly safe (mirrored) location as part of our backup status information. This information is called the Backup Status Block (BSB). It is described in section VI. The present invention also logs this update to the BSB, making the information recoverable from the log as well.

VI. The Backup Process

The backup process should be as inexpensive as possible, comparable to the cost of ordinary backup as done in non-versioned databases. For that reason, the present invention minimizes the number of nodes read and written, and also performs batch writes of the information that backup needs to store stably. This is described below.

The time-splits needed to provide database backup are performed in a tree traversal of the TSB-tree. The backup is done in key order, nodes with lower keys being backed up before nodes with higher keys (or consistently the reverse). This has two desirable results.

1. An index node is backed up immediately after its descendents. This assures that the backup version of the index node references the new backup versions of all descendant nodes. Upon backup completion, all backup versions are accessible from the root of the history tree. It is this property that assures a new log safe point for media recovery.

2. An index node will most likely remain in cache and available while its descendents are being split. Hence, the effect is to batch the updates to the index node.

Aside from posting index terms to current index nodes (discussed above), the writing done by backup consists of logging the index posting and writing the history nodes. Both of these can be done in sequential batches.

Because of this sequential allocation of history file space, the present invention can write the backup history nodes as part of large sequential writes. During backup, as soon as a node is split, the present invention places its history node in the output history buffer, which serves as an output queue. This gives it a location and causes it be written in location order when the present invention performs sequential writes. Nodes are entered into the output history buffer before their ancestor nodes. The ancestor nodes are backed up as soon as all their descendents are finished with. Hence, they will be written after their descendents.

A history node is written prior to the log record that describes the split. To enforce this protocol AND batch the writing of history nodes and log records suggests that several history nodes be written prior to the posting of their index terms. Then, the index node can be updated with a group of backup-induced index terms, producing log records for these updates in a batch as well. Thus, batch writing of history nodes and log records is feasible while observing the ordering requirements for correct concurrency and recovery.

Backup maintains two data structures, the Sweep Cursor and the Backup Status Block. These are described below.

The Sweep Cursor encapsulates the instantaneous state of the backup. Its information permits the ordering requirements of backup to be enforced. Its restoration after a system crash permits an interrupted backup to be resumed. The Sweep Cursor contains the following information.

Log Key: the key for the last node whose backup is recorded stably in the log.

History Key: the key for the last node whose history node has been written stably to the history database.

Last Key: the key for the last node whose backup has been completed and whose elements exists in volatile memory. This includes the posting of the index entry in volatile memory.

Unposted Terms: Associated with each history node that has been written but whose corresponding index term has not yet been posted, a record is entered here of the form of the index term to be posted.

To enforce the writing of the history node prior to the logging of the split, the present invention requires History Key≧Log Key. The log cannot be written to stable storage, updating Log Key, until sufficient history nodes have been written. The History Key can get arbitrarily far ahead of the Log Key, should that be convenient, e.g., to facilitate batch writing of the history database.

Since parent index nodes are not updated until history nodes are stable, Last key≦History Key. The write-ahead log rule implies Log Key ≦Last Key.

After batch writing a group of history nodes, the backup process processes the Unposted Terms recorded in the Sweep Cursor. The posting of index terms to an index node is batched as a result of this staging of the process.

The Backup State Block (BSB) provides a highly durable repository in a known location for information related to backup. This information is of two types:

(i) information needed to quickly initiate recovery from media failures; and (ii) information that assists in making the resumption of backup fast should the system crash during backup. While much of the information is present redundantly on the log as well, having it in the BSB avoids the scanning of most of the log to recover it. The BSB contains the following:

BACKUP ROOT: the location of the history root of the last complete backup. This determines where media recovery finds the backup that should be restored.

SAFE POINT LSN: the redo safe point LSN associated with last complete backup. This determines where media recovery should start its redo scan of the log.

NCV LSN: the LSN of the last checkpointed copy of the NCV. During normal processing, the present invention checkpoints the NCV to the log whenever a transaction recovery log checkpoint is performed.

NEW SAFE LSN: the redo safe point LSN associated with the in-progress backup. This will become th e SAFE POINT LSN when the current backup is complete. It is NIL when backup is not in progress.

The BSB may contain other information relevant to backup, such as when the next backup is scheduled.

The BSB is forced whenever a transaction recovery checkpoint is taken. This assures that its information can be fully brought up-to-date by scans that involve only the crash recovery log. Backup resumption is treated below. Media recovery is the subject of section VII.

It is unacceptable to undo back-up t o its start following a crash. Indeed, once history nodes have been written to a WORM device, it is not possible to completely undo the backup. Rather, the present invention wants to resume backup from the point that was reached thus far.

Backup produces stable testable state that allow s it to be resumed across system crashes. The history nodes written a re stable, as are the log records describing the updating of index nodes. The nodes changed since the last backup are all recorded on the media recovery log. Hence, the NCV can be recovered. The BSB redundantly contains recent backup state information that makes resumption fast.

First, normal database recovery is performed, bringing all nodes up to the state as of the time of failure. Recall that TSB-tree backup splits are not undone, and hence all such splits will be redone where necessary. Normal database activity can resume at this point. BSB updates are described via log records. Hence, the BSB is restored as a result of database recovery.

The NCV must also be restored. Two methods are possible. (i) The log is accessed in a separate pass to bring the NCV's backup up to date. (ii) NCV restoration can be done during the log scan for normal database recovery if NCV updating is made a standard part of redo recovery.

If backup was in progress when the crash occurred, the present invention needs to restore the Sweep Cursor. The crash recovery log is searched back from its end. The first backup log record encountered indicates the last completed backup and its HIGHKEY provides the value for Log Key and for Last Key.

To determine the value for History Key, the history database is scanned from the location of the history node stored as the HISTORY attribute in the log record above to history database end. The high key of the last backup node encountered in this scan becomes the History Key attribute of the Sweep Cursor. The Unposted Terms are re-created during this scan by examining the key and time attributes of the history nodes. Once the Sweep Cursor is re-generated in its entirety, normal backup resumes.

VII. Media Recovery Process

When there is a media failure, the current database is reconstructed from the most recent accessible history nodes and the media recovery log. The first step is to restore all damaged current nodes that have backups from the most recent accessible history nodes. The way in which this proceeds will differ depending on the nature and extent of the failure and is discussed in the next subsections. After the restore step is completed, and prior to applying the log, failed nodes that existed at the time of the last backup all have been restored with valid past states.

With independent redo for current nodes, each of the restored nodes can be rolled forward based solely on their log records and their restored state. The log will contain sufficient information to regenerate all nodes that do not have backup copies in the history database. These were created only via key splitting. Their initial contents have been stored in the log and they can be re-created without access to backup versions. Applying the media recovery log proceeds exactly like ordinary redo recovery after a system crash. The only difference is that the media failure redo scan starts at the media safe point, stored in the BSB, as opposed to the crash recovery safe point.

When the history database is accessed, different types of failures may occur. The important issue is how to minimize the number of I/O accesses. The present invention wants to minimize (i) the read accesses to the history database, which might be stored on a WORM device with a breathtakingly slow access rate; (ii) the write accesses needed to restore the backups to the current database; and (iii) the read accesses to the media log when rolling the restored database forward.

Recall that a backup is generated via a TSB-tree traversal. For a full restoration, traversing the history tree, starting at the history root has the advantage of encountering substantial clustering of history nodes needed for database restoration. For each index node, the backup history nodes for its descendents are clustered into a set of regions of almost contiguous backup nodes on the archival medium in which the history database resides. There will be one such region for each backup sweep whose history nodes are among the still relevant backup set for the current database.

History nodes from the most recent backup will exist at very high density in their region because only occasional ongoing activity during the backup will break the sequence of backup history nodes. As the regions associated with increasingly older backups are accessed, the density of occurrence of still relevant history nodes declines. This is because more and more of the history nodes written by these backups will have been superseded by more recent backups.

Despite the only approximate nature of the contiguity of backup history nodes, the present invention uses this locality to minimize the number of accesses required to read the backup nodes. The present invention can identify regions of archival storage space where the density of nodes that need to be read for restoration exceeds some threshold, e.g., 50%. The present invention can read these regions in large sequential reads, spending some data transfer in order to save the access times. Further, performing archive access such that nodes from each backup sweep are processed together results in small disk arm movements.

Should the archival medium be a WORM device, it will frequently be the case that all data is under the read head of the device for nodes written in each backup. Hence, the access arm would not need repositioning. Adjacent tracks can be reached also, without arm movement, by pivoting the mirror at the head. Thus, even without a large sequential read, the present invention can take advantage of the proximity introduced by the backup process to minimize costly arm movement during database restore.

The same strategy used here for a full database restore can be used to restore an entire subtree of the TSB-tree. The only difference is that the root of the subtree is found by searching the current database for the index term that refers to the damaged subtree. Then, the most recent history node associated with that index node becomes the "root" of the history time slice traversed.

A restored database, or substantial part thereof, needs to be relocated to new stable (disk) storage during the restoration step. When the recovery log is applied to the backup database, we translate the old locations of current nodes, as recorded in the log, to the relocated locations of the restored backup versions, and apply the log records to the relocated nodes.

Of course, one could do the above translation in a trivial manner by organizing the restored database so that "relative addresses" within some storage area are preserved. This makes the size of the translation information very small. However, to maximize the efficiency of writing the current database, it would be better to build a RELOCATION TABLE while traversing the history database and to relocate the nodes of the restored database such that nodes that are adjacent when reading the backup are written contiguously when posted to the restored database. The writing of the restored database can then require a very small number of large sequential writes.

The RELOCATION TABLE is built in main memory as database restoration proceeds. The write-optimized RELOCATION TABLE requires an entry per node to be restored. Given today's large main memories, restoring a current database of one million nodes (eight million bytes for a million entry table) while keeping this table memory resident is certainly feasible.

As with conventional media recovery, the media recovery log can be periodically processed so as to optimize the roll forward of the database. This involves what is called "change accumulation" [Gray, J. Notes on database operating systems, Research Report RJ2188, (February 1978), IBM Research Division, San Jose, Calif.]. The log is sorted by node and within node by time. The result is that the part of the log relevant to the rolling forward of a node is stored contiguously. This minimizes the number of times a restored node needs to be visited during the roll forward process. If the RELOCATION TABLE approach is taken, it is useful to sort the log by the relocated addresses of the restored database. This permits a single sequential scan of the restored database for this step, at the cost of the log pre-processing.

The bottom line is that there need be only a modest number of access arm movements to read the backup nodes from the archival medium, a few per backup that is still reflected within an index node. To write the backup nodes to a restored current database can be done nearly sequentially. Hence, restoration is a very high performance process.

Media failure often involves only a single node. For these localized media failures, using the TSB-tree's history nodes as the source of the backup is a substantial advantage. The TSB-tree's index, which is available to us in the current database, can be used to locate the backup node.

If the key range of data in the corrupted node is known, the present invention can readily find a backup version in the history database. The present invention uses the key range information to search for the node in the TSB-tree and then searches back in time for the history node. The present invention uses this history node to restore the corrupted current node. This node is then rolled forward by applying the recovery log.

If the corrupted current node does not have a history node, then it was produced as a result of a key split. Such a node can be restored fully from the recovery log.

If a corrupted node is encountered in such a way that its key range is not known, then more extensive searching is required. The locations of current nodes that have backups are all in history index nodes of the TSB-tree. With an index node fan-out of around 200, the TSB-tree index represents about 0.5% (0.005) of the database. Even scanning all the current entries in the most recent history index for the failed node requires only a small fraction of the I/Os needed for a search of the entire backup database. And usually, some information is available about the possible range of keys.

VIII. Discussion

The backup process has been designed to have performance competitive with conventional database backup while permitting the backup to also be used as a history database. This has not compromised the performance of the TSB-tree in its usual role of accessing multiple versions of data.

1. Single version current utilization is not adversely impacted and may, in fact improve. More history versions are removed from the current nodes by the backup process, meaning that there is more room to store the current versions.

2. The height of the TSB-tree index should not be much affected because of the systematic replacement of redundant history nodes with history nodes that "cover" them. This purging of prior nodes from the tree should be very effective in avoiding tree growth. Node covering should occur with high frequency.

3. Index node time-splitting has enhanced effectiveness. Backup permits the time chosen for the splitting of an index node to advance because the oldest current index term is only as old (approximately) as the last backup. The splitting of index nodes permits history index terms to be removed from the index nodes, which works to keep the height of the current tree small.

4. Multiversion total utilization should be comparable to that achieved by using WOB splitting, i.e., the splitting regime of the WOB-tree [Easton, M.

Key-sequence data sets on indelible storage, *IBM J of R.D.* 30.3, (May 1986) pp. 230-241] in which the entire current node becomes the history node, when the "covered" nodes are ignored. Thus, utilization, in its impact on search performance and on the nodes encountered in a search, is not adversely affected. Of course, the existence of the covered nodes which have been purged from the tree means that additional history space is consumed. Even there, should the backup be to another magnetic (or erasable) disk, the space used by the covered nodes could be reclaimed. Only on a WORM device is a history node forever.

The process described organizes the backup process by subtree. That is, nodes that share close ancestors are written close to each other physically in the history database. Media failures are more likely to corrupt physically contiguous parts of the current database than logically close nodes in the TSB-tree.

It is possible to organize the backup process to deal with this. The cost of the backup is likely to be higher so as to make recovery faster. One can backup entire contiguous storage areas. Then one can update the TSB-tree index to reflect that this backing up has been done. This requires finding the logical nodes that correspond to the physical space. Usually, this is written into the nodes themselves. More data will probably be written to the history database because nodes that haven't changed will be written as part of the storage area.

One caveat here is that this technique should probably be limited to the data nodes. The index nodes are written after their descendents if they are to reference the backup versions of their descendents. Storing the index in a separate storage area helps to accomplish this.

At recovery time, the entire storage can be restored via a single or a small number of sequential reads. Hence, recovery can be done very rapidly. Relocating the storage area is also simplified since the new origin of the restored storage area can serve to relocate all nodes in the storage area. A table with an entry per node is not required.

It is very common for a database system to store the bulk of its data in an entry-ordered file and to access that data via record identifiers (RIDs). The RIDs typically have two parts, a page identifier (PID) and slot identifier within the page (SID). Thus, an RID is a pair<PID,SID>. This organization is called a "pinned record" organization as the records are always located by going to the PID named page and looking at the SID slot. The record itself can move, but it is accessed via its slot.

A TSB-tree can be used as a history database for a current database of the pinned record form. The key used in this TSB-tree is the PID. The TSB-tree located history versions of records via their PID and the time of interest. The current database is accessed directly via the PID.

Such a tree is built gradually as current database pages time-split. The time-splitting of a page causes its entry into the TSB-tree with an appropriate time. This page can be written directly to the archival medium (e.g., a WORM device) since it is not further updated. This process is entirely conventional for the TSB-tree for time splits. Key splits never occur in data pages. Having used the TSB-tree to gain access to history versions of pinned records, it now becomes possible to use the TSB-tree for backup purposes as well. In this case, there is the added advantage that physical and logical locality are synonymous. Thus, the tree traversal and the storage area approach come together. Backup remains fast and recovery speed in enhanced.

We claim:

1. For use in a database system, a method of media recovery, comprising the steps of:

providing a two-dimensional search structure at least partly defined by nodes and key and time dimensions, such that certain data in the database system is located by traversing the nodes using respective ones of the key and time dimensions, said nodes including history nodes which are periodically written to a secure medium and including current nodes and index nodes;

time-splitting into current nodes and history nodes, current nodes having data that has changed and has not been written to the secure medium; and using only the history nodes to recover from an undesired and abnormal system interruption.

2. A method of media recovery, according to claim 1, wherein the step of using the history nodes includes the step of restoring damaged current nodes by using the history nodes that have the most recent versions of data.

3. A method of media recovery, according to claim 2, wherein the step of using the history nodes includes the step of providing a media recovery log.

4. A method of media recovery, according to claim 1, wherein the step of time-splitting is for back-up and does not include making changes to current nodes.

5. A method of media recovery, according to claim 1, wherein the step of time-splitting includes purging unneeded index terms from the index nodes.

6. A method of media recovery, according to claim 1, wherein the step of time-splitting includes writing the history node to the secure medium.

7. A method of media recovery, according to claim 3, further including truncating the media recovery log in response to said step of time splitting so as to remove log records therefrom which are reflected in the history nodes that have been written to the secure medium.

8. A method of media recovery, according to claim 4, further including using short locks during the step of time-splitting to enhance concurrency and minimize impact database system operation.

9. A method of media recovery, according to claim 1, wherein the two-dimensional search structure includes a time-split B tree structure.

10. A method of media recovery, according to claim 1, wherein said certain nodes include index nodes having data or index terms that has changed and has not been written to the secure medium.

* * * * *